United States Patent
Meyer

(10) Patent No.: US 10,648,062 B1
(45) Date of Patent: May 12, 2020

(54) STRATEGIC METAL AND MINERAL ELEMENT ORE PROCESSING USING MIXING AND OXIDANT TREATMENT

(71) Applicant: George Meyer, Oxnard, CA (US)

(72) Inventor: George Meyer, Oxnard, CA (US)

(*) Notice: Subject to any disclaimer, the term of this patent is extended or adjusted under 35 U.S.C. 154(b) by 286 days.

(21) Appl. No.: 15/821,304

(22) Filed: Nov. 22, 2017

Related U.S. Application Data

(60) Provisional application No. 62/475,528, filed on Mar. 23, 2017.

(51) Int. Cl.
| | |
|---|---|
| *C22B 59/00* | (2006.01) |
| *C22B 11/06* | (2006.01) |
| *C22B 3/42* | (2006.01) |
| *C22B 3/00* | (2006.01) |
| *C22B 3/06* | (2006.01) |
| *C22B 3/10* | (2006.01) |
| *C22B 3/44* | (2006.01) |

(52) U.S. Cl.
CPC ............. *C22B 59/00* (2013.01); *C22B 3/06* (2013.01); *C22B 3/10* (2013.01); *C22B 3/42* (2013.01); *C22B 3/44* (2013.01); *C22B 11/04* (2013.01); *C22B 11/06* (2013.01)

(58) Field of Classification Search
CPC .... C22B 3/06; C22B 3/42; C22B 3/10; C22B 3/44; C22B 11/04; C22B 11/06; C22B 59/00
See application file for complete search history.

(56) References Cited

U.S. PATENT DOCUMENTS

| | | | |
|---|---|---|---|
| 3,880,653 A | 4/1975 | Hougen | |
| 3,998,628 A * | 12/1976 | Gandon | C22B 3/10 423/40 |
| 4,188,362 A | 2/1980 | Edwards et al. | |
| 4,389,248 A | 6/1983 | Iio et al. | |
| 4,397,689 A | 8/1983 | Lea et al. | |
| 4,723,998 A | 2/1988 | O'Neil | |
| 4,923,510 A | 5/1990 | Ramadorai et al. | |
| 4,979,986 A | 12/1990 | Hill et al. | |
| 5,139,752 A | 8/1992 | Nakao et al. | |
| 5,236,676 A | 8/1993 | Touro et al. | |
| 5,851,499 A | 12/1998 | Gathje et al. | |
| 9,206,491 B2 | 12/2015 | Lalancette et al. | |
| 9,206,492 B2 | 12/2015 | Lalancette et al. | |
| 2002/0112569 A1 | 8/2002 | Farone et al. | |
| 2006/0219571 A1 | 10/2006 | Kim et al. | |
| 2011/0083531 A1 | 4/2011 | Soldenhoff | |
| 2015/0114182 A1 | 4/2015 | Parkes et al. | |
| 2016/0237524 A1 | 8/2016 | Shuck et al. | |

FOREIGN PATENT DOCUMENTS

| | | | | |
|---|---|---|---|---|
| GB | 795792 A | 5/1958 | | |
| GB | 2406852 A | 4/2005 | | |
| WO | 0183835 A2 | 11/2001 | | |
| WO | WO-02053788 A1 * | 7/2002 | ............... | C22B 1/08 |

* cited by examiner

Primary Examiner — Tima M. McGuthry-Banks
(74) Attorney, Agent, or Firm — Suiter Swantz pc llo

(57) ABSTRACT

The present disclosure is a method and system for the processing of ore and ore tailings to recover metals, minerals and rare earth elements, and more particularly to a method and system for treating the ore and ore tailings using a closed loop chlorine gas oxidant treatment system using an electrochemical cell and the co-addition of an additional oxidizer such as chloric acid to enhance the dissolution of the metals from the ore which is then further processed to separate and recover the metals.

18 Claims, 4 Drawing Sheets

STRATEGIC METAL AND MINERAL ELEMENT ORE PROCESSING USING MIXING AND OXIDANT TREATMENT

CROSS REFERENCE TO RELATED APPLICATIONS

The present application claims the benefit under 35 U.S.C. § 119(e) of U.S. Provisional Application Ser. No. 62/475,528, filed Mar. 23, 2017. U.S. Provisional Application Ser. No. 62/475,528, filed Mar. 23, 2017, is incorporated by reference in its entirety.

TECHNICAL FIELD

The present disclosure generally relates to the field of ore processing to recover metals minerals and rare earth elements, and more particularly to a method and system for treating ore and ore tailings using a mixing apparatus and on-site generated oxidizers to dissolve the metals from the ore which is then further processed to recover the metals.

BACKGROUND

It is well known to employ processing chemicals in the recovery of metals, minerals and rare earth elements. Metal ore processing in the past has employed various processing chemicals, some of which have had potential damaging effects to the environment. These processing chemicals may include mercury, cyanide, metal salts, alkali and alkaline metal salts, and strong acids.

A number of patents and literature references describe the use of chlorine as an oxidant in the removal of metals from ores. Chlorine gas has been previously used as a chemical oxidant, but it has been employed as a gas oxidant under positive pressure and elevated temperatures, which can result in unsafe operational discharge of chlorine to the atmosphere. In addition, the transport of liquid chlorine has become a safety transportation issue.

A number of conventional techniques combine the use of an aqueous chlorine solution, as well as hypochlorite which is another alternative chlorine-based chemical, in combination with the co-addition of a strong acid, such as HCl, as well as the addition of other additives such as chlorides (e.g., NaCl), metal salts such as iron compounds (e.g., $FeCl_3$), and the addition of other oxidants such as ozone. The co-addition of the strong acids requires additional chemical expenditure costs and results in a dramatically greater volume of spent chemicals that need to be neutralized, processed, and recycled.

Other conventional techniques describe combining the use of cyanide with oxidizers or only use of chlorine in the gas form for the process of pre-treating the ore or additional treatment at high temperatures using chlorine and other gas Halogen oxidizers such as ozone.

In addition, a number of conventional techniques describe processes utilizing various mixing apparatus with the process oxidants employing stirring impellers or mixing blades which can consume significant amounts of energy as well as having established maintenance issues with equipment wear, erosion, and corrosion.

Thus, there is a need for an environmentally acceptable ore processing process that can utilize the oxidation potential of chlorine gas and/or other on-site generated oxidants and yet still provide environmentally acceptable methods for the safe recycle of the ore processing solution chemicals.

SUMMARY

Accordingly, an environmentally friendly process is needed that provides for the ease of leaching and recovery of metals, minerals and rare earth elements from ores and provides for ecologically responsible recycling and regeneration of the byproducts back into the active oxidant(s) required for the process. Ecologically, the process may not require high processing temperatures or pressures, or the addition of mixtures of acids that are difficult to regenerate, or use multiple oxidants which can generate byproduct(s) that cannot be easily recycled back into the active oxidant.

The present disclosure is a method and system for the processing of ore and ore tailings containing metals and rare earth metals to recover these metals in an environmentally acceptable and safe method. These metals and rare earth metals are defined as strategic and critical materials by the United States as well as other countries worldwide and are often stockpiled for national emergencies. These strategic materials may include the platinum group metals and precious metals, which include Pt, Pd, Ru, Rh, Os, Ir, Au, Ag, and Re. The rare earth metals on the strategic metals include Sc, Y, La, Ce, Pr, Nd, Pm, Sm, Eu, Gd, Tb, Dy, Ho, Er, Tm, Yb, and Lu. The processing conditions of the disclosed process, both in the oxidant treatment and post treatment may be modified to enhance the processing in the recovery of these specific metals and rare earth metals.

The disclosed method may include use of a low maintenance and low energy consumption rotating mixing apparatus for contacting the ore as an aqueous slurry using selected chemical gas oxidants as well as employing the safe on-site use and generation of these chemical oxidants used in treating the ores. The metals dissolved from the ore may be recovered as an aqueous solution which is then further processed to recover and separate the recovered metals using chemical processing methods including ion exchange and chemical neutralization steps. The use of selected reducing agents, such as hydrogen peroxide, organics such as citric and ascorbic acid, alcohols, and nitrogen compounds, such as urea, may specifically reduce the amount of salts generated during the processing. The salt reduced oxidant-processed ore is then suitably rinsed and the salt solution is re-used in producing the generated oxidant needed for the process. The rinsed ore is then safe for environmentally responsible recycling back to the environment and the remaining barren solution may be recycled to the process.

One preferred employed process oxidant is gaseous chlorine, which may be generated in a membrane-based electrochemical cell including an anode compartment and a cathode compartment. A purified sodium chloride brine may be used as a feed to the electrochemical cell. The products from the electrochemical cell may include gaseous chlorine, a sodium hydroxide catholyte co-product, and hydrogen gas.

Other oxidant combinations in treating the ore may also be used to enhance the ore chemical treatment. These other suitable oxidant combinations may be used alone or in combination with the gaseous chlorine oxidant. In particular, these oxidant combinations may include chloric acid or chloric acid and sodium chlorate mixtures that may be electrochemically generated.

The process ore mixing and contacting system may operate under a negative pressure when chlorine gas is utilized as the oxidant, allowing for safe operation. The system may be operated under vacuum control.

The metal containing solution recovered from the ore processing may then treated with a reducing agent to remove any residual oxidant in the solution in the subsequent metal processing steps. Preferred reducing agents may be those that do not contribute to adding any additional salts, other than chloride, to the recycled process solution that would be difficult to separate in the effluent recycle process. For example, the addition of sulfur containing reducing agents, such as sodium sulfite, to the recovered ore solution would form sulfates in the solution, which would have to be eventually separated from the chloride based recycle solution. Reducing agents, such as hydrogen peroxide, ascorbic acid, and urea, may be preferred since they do not add to the formation of additional salts, such as sulfate, to the recycle solution. The recycle solution may be treated to produce a purified sodium chloride feed solution to the electrochemical cell to generate chlorine. The addition or formation of sulfates in the process, such as sodium sulfate, may require some additional effluent processing steps for its removal.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Figure 1:
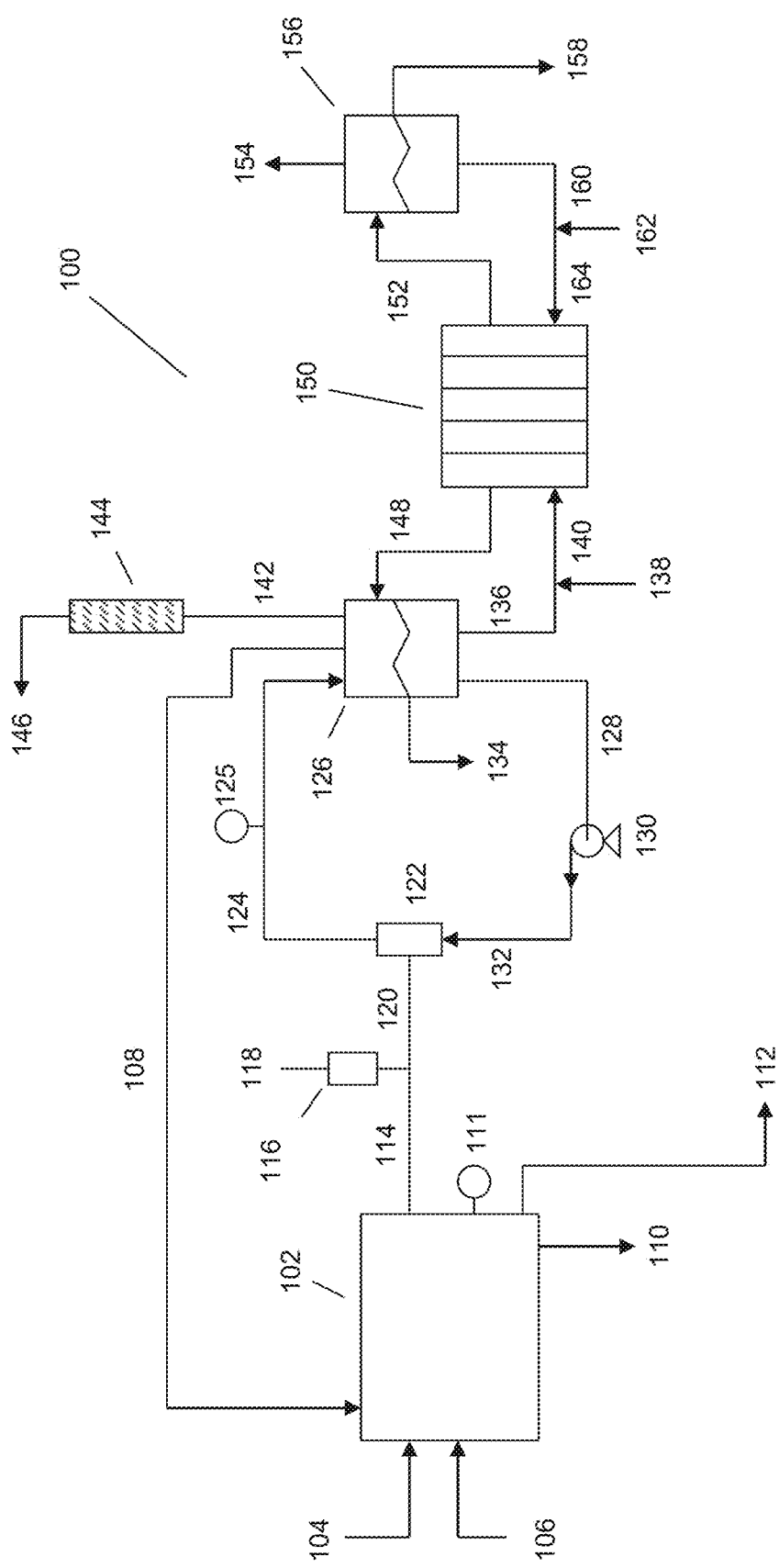
FIG. 1 depicts a treatment system for contacting the ore and ore tailings in a mixing apparatus with an electrochemically generated chlorine gas stream employing a chlorine gas eductor in accordance with an embodiment of the present disclosure.

Reference will now be made in detail to the subject matter disclosed, which is illustrated in the accompanying drawings.

Before any embodiments of the disclosure are explained in further detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

The present disclosure describes a method and system for the oxidative treatment and recovery of the platinum group metals, precious metals, and rare earth metals from ores and ore tailings. The treatment method may employ one or more oxidizers, preferably produced on-site using electrochemical cells to produce the oxidizers required in the ore treatment. The electrochemical cells may co-produce the oxidants as well as alkali metal hydroxide co-products that may be required in the post-operation chemical treatment and neutralization of the pregnant aqueous metal containing solution recovered from the oxidant treatment of the ore.

The present disclosure utilizes a number of features to achieve an ore processing method and system that is safe, environmentally friendly, and efficient in recovering precious and rare metals from the ore. These features may include a method of producing and contacting the ore with a chlorine gas generated electrochemically on-site with the chlorine gas system operating under sub-atmospheric or negative pressure, thus allowing the system to be operated safely with no discharge or leaks of chlorine from the processing to the environment. Prior art methods often utilized pressurized chlorine, which may be dangerous, in addition to requiring the transport and delivery of chlorine gas in pressured cylinders or railcars. The electrochemical chlorine generation system, performed on-site, may allow for co-producing alkali metal hydroxide, which can be used for neutralizing any acids in the process overall processing and effluent treatment.

A method of mixing and contacting the ore with chlorine gas in a rotating mixing apparatus, allowing for the efficient mixing and contacting of the chlorine gas with the ore may be employed. This mixing method may require the least amount of power in addition to the least amount of wear and tear in comparison to the mixing equipment employed in the prior art that utilized mixing impellors and blades which quickly wear down because of the abrasive properties of the ore.

It is contemplated that the methods of the present disclosure may not require the addition of external concentrated acids, transition metal chlorides, alkali metal chlorides, alkali metal salts, or other additives to the ore during the chlorine processing as employed in the prior art. The addition of large amount of acid and salts requires a large recycle chemical processing system to neutralize and recycle these salts, resulting in a large amount of waste that cannot be recycled, and which must be properly disposed.

A method in employing selected dechlorination reducing agents in the process that do not increase the salt load in the recycle system may be employed. These reducing agents include hydrogen peroxide, organics such as citric acid and alcohols, and nitrogen compounds such as urea. Amounts of the reducing agents are required to remove the trace amounts of residual chlorine in the treatment of the liquid obtained from the ore processing that contains the extracted metals and rare earth metals.

A method in employing a compatible co-oxidant in the ore processing which may be used with the chlorine treatment or used separately by itself without the chlorine, such as chloric acid. It has been found that chloric acid provides a benefit in the ore treatment process with chlorine, achieving a higher recovery of the metal from the ore and in a shorter time period. A final reaction product from chloric acid may be chloride, which is compatible with alkali metal chloride system used in the electrochemical cell system. The chloric acid oxidant may be preferably generated on-site electrochemically, using an alkali metal chlorate, such as sodium chlorate, as the feedstock.

A method of recovering the metals from the ore after dechlorination which may include various selected metal recovery methods and procedures such as the use of selective ion exchange resins and selected chemical precipitation and extraction methods using pH adjustment, addition of complexing agents, addition extraction agents, and the like may be employed.

These and other features of the disclosure are detailed below.

The ore, which may be slurried with water, is contacted with the selected oxidants in a mixing apparatus for a period of time. The advantage of the mixing apparatus is that it may be rotated and does not require any rotating impellors or blades, as used in prior art processes, which dramatically reducing maintenance and associated equipment wear. The mixing apparatus may be constructed of suitable metals, alloys, plastics, and thermally-sprayed metals and ceramics selected for corrosion resistance, and may also employ suitable liners or coatings made from various oxidant-resistant materials such as elastomers, metals, rubber, and plastics. The mixing apparatus may employ permanently attached or removable stationary baffles that help in mixing and contacting the ore slurry with the selected process oxidants. The mixing apparatus may be configured to rotate horizontally and can be hydraulically tilted forward and backward to allow for the entry and exit of the ore or ore tailings into and out of the rotating mixing apparatus.

Referring to FIG. 1, a system 100 for the processing of precious metal and rare earth metal containing ore and ore tailings is shown. Mixing apparatus 102 may include an ore input hatch or entry seal 104 and a water input 106 to produce an ore slurry in mixing apparatus 102. A chlorine gas stream 108 may be educted under vacuum into mixing apparatus 102, where the ore may be intimately contacted with the chlorine gas. The chlorine gas may exit the mixing apparatus 102 as a depleted chlorine gas stream 114. Mixing apparatus 102 may include an exit port 110 configured to remove a pregnant aqueous solution stream that contains dissolved precious and rare earth metals. Mixing apparatus 102 may include an exit hatch or seal (not shown) for discharge of the processed, treated ore as stream 112. Mixing apparatus 102 may be configured for rotation at various speeds as needed for the processing, such as 1-10 revolutions per minute. Sampling points (not shown) are used to determine metal composition as needed, and pH sensor 111 may be employed to monitor the pH of the aqueous solution phase of the ore slurry. The metal composition analysis may be conducted, for example, by using XRF (X-Ray Fluorescence) on or off-line, which may determine and be used to monitor the metal composition and concentration in the ore slurry solution and in washed samples for the solids portion of the treated ore in the slurry. It may also be used to determine the metal composition of the ore before the run is conducted and after the treatment.

Vacuum controller 116 may control the vacuum in the chlorine gas recirculation loop and introduce air 118 as needed to control the vacuum level in the chlorine gas loop. Depleted chlorine gas stream 114 may exit mixing apparatus 102 and pass through vacuum controller 116 to become stream 120. Stream 120, including depleted chlorine and some air, may enter a suction side of eductor 122. Eductor 122 may generate a negative vacuum suction from the flow of brine generated by recirculation pump 130. Recirculation pump 130 may receive a brine input stream 128 (such as NaCl input stream) and pump a pressurized solution to the eductor 122 as stream 132. A gas/liquid stream 124, which may include depleted chlorine gas and the liquid brine, may exit the eductor 122 and then return back into anolyte gas/liquid disengager 126. The brine solution in the gas/liquid stream 124 is monitored by pH sensor 125. Anolyte gas/liquid disengager 126 may separate chlorine gas from the brine anolyte solution which enters as stream 148 from electrochemical cell 150. Anolyte gas/liquid disengager 126 may include a chlorine vent system including a stream 142, chlorine absorber 144, and exit gas line 146. The vent system may be actuated using a solenoid (not shown) which operates to vent and relieve any positive pressure that might occur in anolyte gas/liquid disengager 126. Chlorine absorber 144 may be equipment in different forms which may use some of the sodium hydroxide (stream 158) generated by electrochemical cell 150. Other chlorine gas absorbents may be used such as carbon or lime and the like.

Anolyte gas/liquid disengager 126 may include a return stream 136 that is mixed with a concentrated alkali metal chloride brine stream 138 (such as NaCl) before it enters electrochemical cell 150 as stream 140. Concentrated brine stream 138 may be metered into the anolyte loop to control the concentration of brine in a specific concentration range. Instruments, such as instruments that measure conductivity, may be used in the anolyte loop to monitor and control the brine concentration. Excess anolyte volume may exit anolyte gas/liquid disengager 126 as stream 134. Stream 134 may include depleted brine and some residual chlorine, which may be neutralized using a dechlorination agent. After dechlorination, this brine may be re-saturated in a bed of purified-grade solid alkali metal chloride, such as NaCl, to produce a saturated brine, which may then be purified to remove Ca and Mg hardness to suitable levels using chelating ion exchange resins, typically to 100 ppb or less, before it is re-introduced into the anolyte loop as concentrated brine stream 138.

Electrochemical cell 150 may include two process loops. An anolyte loop may include stream 148, containing chlorine and brine solution, into gas/liquid disengager 126, and returning back to the anolyte section of the electrochemical cell via stream 140. Electrochemical cell 150 may include a catholyte loop which includes exit stream 152, catholyte gas/liquid disengager 156, and return stream 164. NaOH and hydrogen gas in stream 152 may be separated in catholyte gas/liquid disengager 156 with hydrogen exiting as stream 154, and NaOH solution exiting as NaOH co-product stream 158. Recirculation stream 160 from catholyte gas/liquid disengager 156 may include deionized water stream 162 added to the stream 160 and may enter the catholyte compartment of electrochemical cell 150 as return stream 164. Deionized water stream 162 is metered into the catholyte loop to control the concentration of the catholyte loop NaOH solution.

pH sensor 125 in the anolyte loop may monitor the anolyte pH and is one of two sensors used to control the chlorine gas output of electrochemical cell 150. Unreacted chlorine gas leaving mixing apparatus 102 may lower the pH of the anolyte loop to a specific range, and the current to the electrochemical cell 150 is reduced or shut off. In this way, the amount of chlorine gas required is controlled, which may optimize the amount of chlorine required for the ore treatment. The control pH range for the anolyte loop may be in the range of about 1 to 4, and more preferably 1.5 to 3.

The other control used for controlling the chlorine output of electrochemical cell 150 is pH sensor 111, which monitors the pH of the ore slurry in mixing apparatus 102. When the pH of the solution in the slurry goes above a specific adjusted setpoint, indicating that the ore treatment requires more chlorine, the electrochemical cell 150 is turned on and the chlorine output is increased. The operating pH control may be set or adjusted in the range of a pH of 0.1 to about 4, and may be adjusted for best treatment requirements for the specific ore chemical characteristics. Thus, pH sensor 111, which measures the pH in the ore slurry of mixing apparatus 102, and pH sensor 125 in the electrochemical cell 150 anolyte loop may be used to control the chlorine output of electrochemical cell 150, both maintaining and maximizing the chlorine consumption efficiency for the process. The control logic may be flexible, where the pH setpoints may be modified and electrochemical cell 150 may be operated with a variable chlorine output under variable current control or may be operated with an on/off control.

Electrochemical cell 150 may be a membrane-divided electrochemical cell employing perfluorinated cation exchange membranes to separate the anolyte reactions from the catholyte reactions. Electrochemical cell 150 may be a single cell or one including multiple cells arranged in a stack to obtain the chlorine production rate required by the process. Electrochemical cell 150 may be powered by a DC power supply (not shown) that supplies the power for the electrochemical reactions to occur in the cell. The DC power supply may be operated in a constant current or constant voltage mode, but most preferably in a constant current mode where the amperage of the current may be controlled to control the chlorine output of chlorine electrochemical cell 150.

Figure 2:
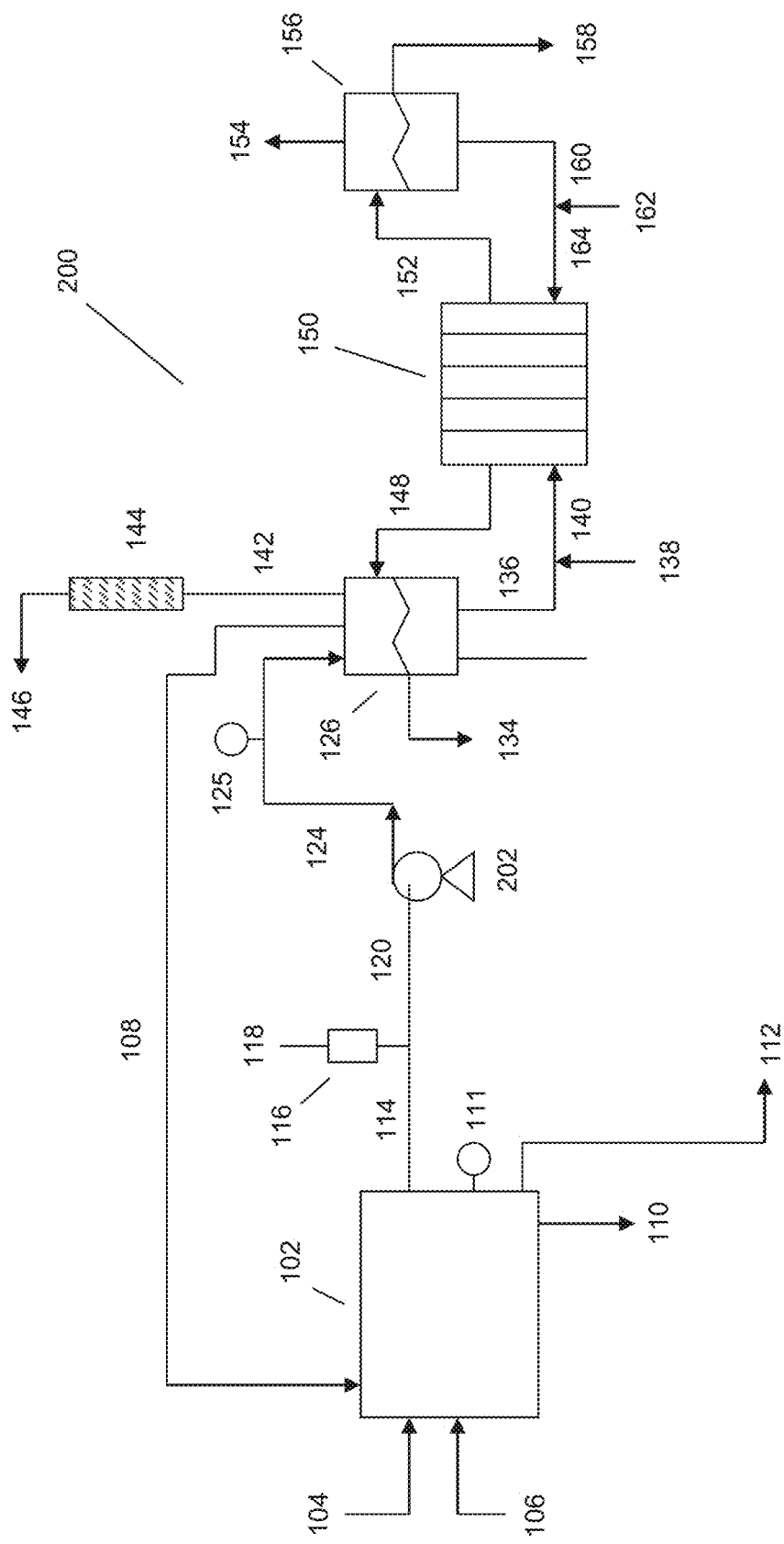
FIG. 2 depicts a treatment system for contacting the ore and ore tailings in a mixing apparatus with an electrochemically generated chlorine gas stream employing a chlorine gas blower in accordance with an embodiment of the present disclosure.

FIG. 2 shows an alternative embodiment, a system 200, for the processing of the precious metal and rare earth metal containing ore and ore tailings. In this system 200, a chlorine gas blower 202 may be employed to provide negative pressure to circulate the chlorine gas from mixing apparatus 102. The depleted chlorine gas enters the blower 202 via stream 120 and exits the blower 202 via stream 124 into anolyte gas/liquid disengager 126.

Figure 3:
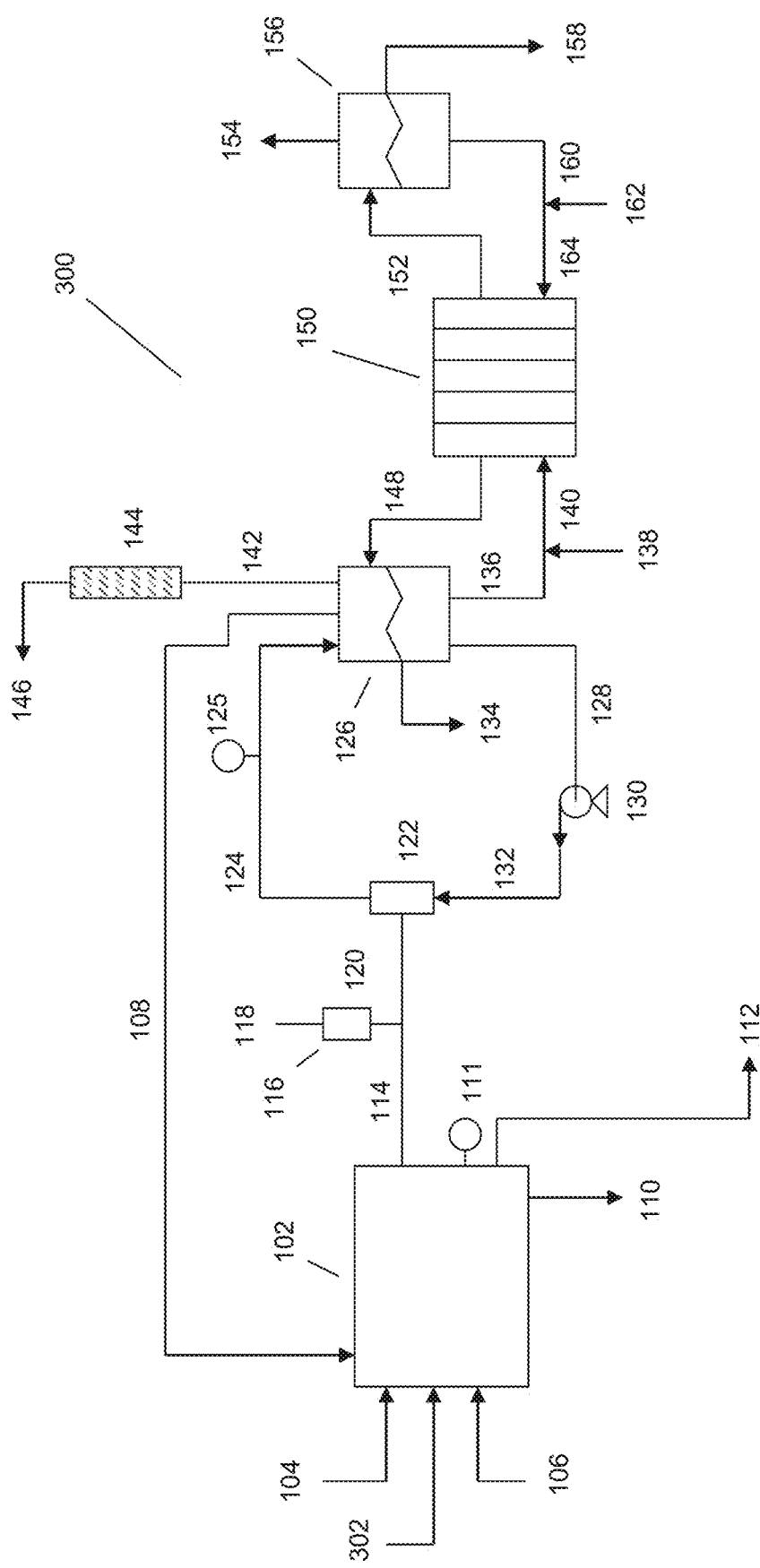
FIG. 3 depicts a treatment system for contacting the ore and ore tailings in a mixing apparatus with an electrochemically generated chlorine gas stream employing a chlorine gas eductor with the addition of chloric acid to the mixing apparatus containing the ore and ore tailings in accordance with an embodiment of the present disclosure.

FIG. 3 shows an alternative embodiment, a system 300, for the processing of the precious metal and rare earth metal containing ore and ore tailings. In this system, chlorine gas eductor 122 may be employed to provide negative pressure to the system and circulate the chlorine gas from mixing apparatus 102 to the gas/liquid disengager 126. Chloric acid or a chloric acid/sodium chlorate mixture 302 may be added to mixing apparatus 102 as an oxidizer to aid in the dissolution of the precious and rare earth metals in the ore. Chloric acid or chloric acid/sodium chlorate mixture 302 may be added to the ore mix at a predetermined point in the treatment, which may be once the ore slurry has reached an acidic pH. The chloric acid or chloric acid/sodium chlorate mixture 302 may be generated chemically or electrochemically using an alkali metal chlorate feedstock.

Figure 4:
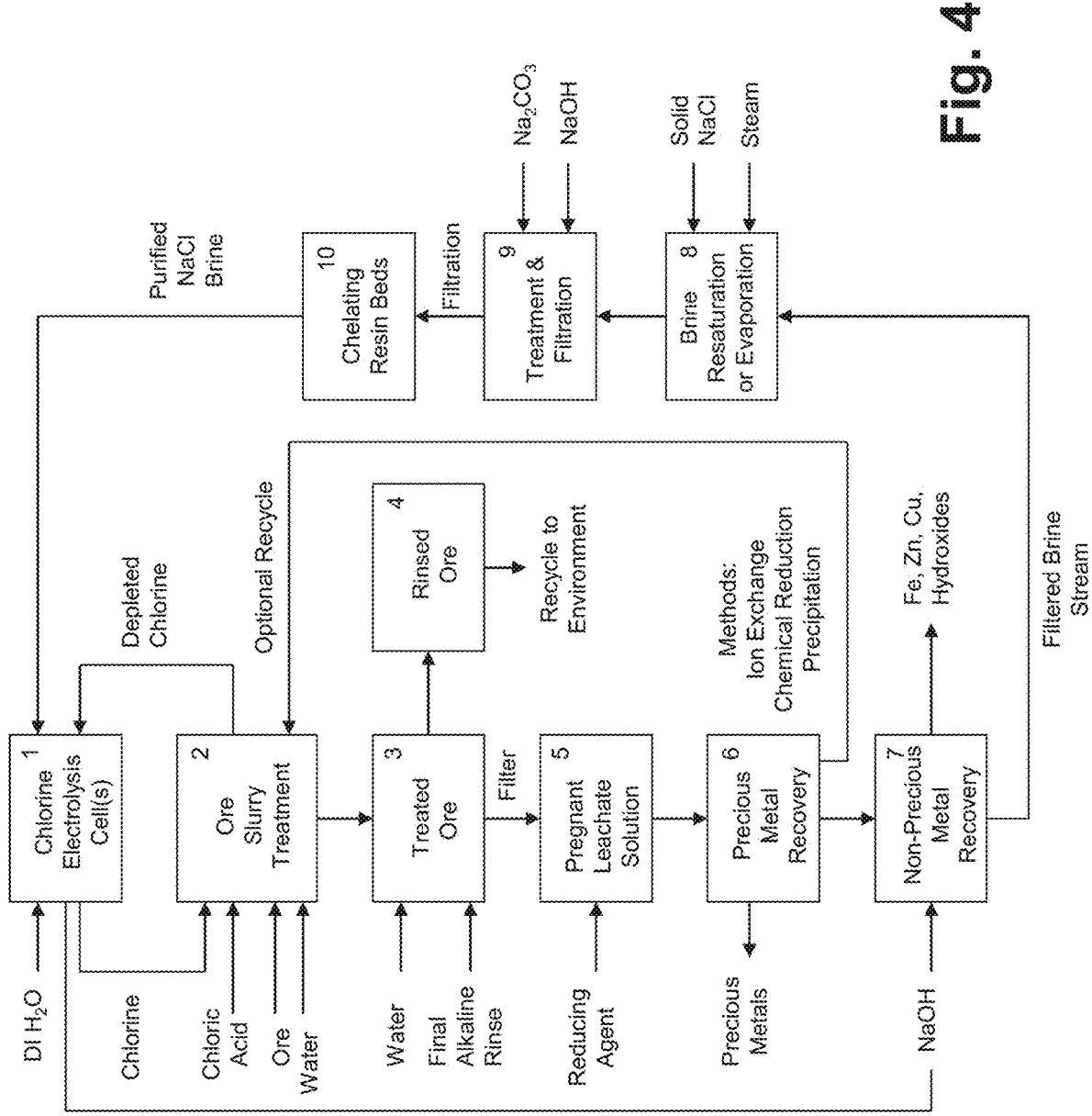
FIG. 4 depicts a process flowsheet of the treatment system and brine recycle in accordance with an embodiment of the present disclosure.

FIG. 4 shows a method for the ore treatment process. Unit 1 shows the electrochemical cell(s) used for generating a chlorine gas product and NaOH co-product. The electrochemical cell may use a purified NaCl brine input feed stream as well as deionized water (DI water) to produce chlorine.

Unit 2 shows the precious metal ore mixing having an input of water to make the slurry, the addition of chlorine gas for the ore treatment and a depleted chlorine gas stream recycling back to the chlorine electrolysis cell(s) for the closed loop chlorine treatment system. Chloric acid may be added as an additional oxidant in the ore treatment.

Unit 3 shows the treated ore being rinsed with water. The treated ore may also have a final alkaline rinse/treatment with a dilute NaOH stream to neutralize any acids in the mother liquor retained in the ore. The alkaline rinse solution may then be passed onto Unit 5 and mixed with the acidic pregnant leachate solution that was separated from the ore. The rinsed ore may then pass into Unit 4 and may be recycled back to the environment as a clean, non-hazardous material.

The pregnant ore leachate solution in Unit 5 may then be treated with a reducing agent to neutralize any residual dissolved chlorine in the solution. Preferred reducing agents are those that do not introduce salts other than chlorides into the process system. These types of reducing agents include hydrogen peroxide, alkaline metal peroxide, urea, as well as organic reducing compounds such as citric acid, ascorbic acid, formic acid, as well as alcohols such as ethanol or isopropanol. The use of urea or nitrogen-based reducing agent compounds must be carefully utilized because of the potential formation of nitrogen trichloride. Typical sulfur based reducing agents may also be employed such as alkali metal sulfites, $SO_2$, alkali metal metabisulfites, and the like, but the brine system operation must be adjusted to manage and remove the amount of sulfates that may be introduced using these reducing agents. Urea may be employed for cost and efficiency considerations because it does not add any sulfur compounds into the solution.

Unit 6 may include recovery of the precious metals and rare earth metals along with additional processing. Gold and some of the other precious metals from the leachate solution may be adsorbed onto resins, and recovered from those resins by various methods including thermal decomposition of the resin. Other methods, such as hydroxide precipitation or chemical reduction, may be used depending on the metals for recovery. Many methods that are known in the art may be employed. The barren sodium chloride containing solutions from the metals recovery may be passed on to Unit 7. Optionally, a portion of the solution, which is acidic, may be recycled to Unit 2 to provide some acidity in the ore slurry treatment reactor.

Unit 7 is where any non-precious metals such as Fe, Zn, Cu, and the like are recovered as insoluble hydroxides, filtered, and may be disposed. NaOH produced in Unit 1 may be used to provide the alkalinity required. The filtered brine stream may then be passed to Unit 8.

Unit 8 is where the NaCl brine solution may be passed through a solid salt bed to saturate the brine solution to concentrations in the 200-320 g/L range, and more preferably to a 250-300 g/L concentration range as a suitable NaCl feed solution for the electrochemical cell in Unit 1. Alternatively, the brine may be evaporated using steam or electrical heat and concentrated, thus only periodically requiring small amounts of NaCl to be added to the system.

The saturated brine from Unit 8 may be fed to Unit 9 where the saturated brine is treated with sodium carbonate and additional NaOH to precipitate most of the Ca, Mg, and Ba hardness in the brine. The NaCl brine is then filtered before it passes onto Unit 10. The filtered brine solution may exhibit a hardness of about 1-5 ppm.

Unit 10 may utilize specialized chelating ion exchange resin beds or columns that are used to remove the remaining soluble hardness present in the filtered brine solution leaving Unit 9. The chelating resin brings the hardness concentration in the brine to less than 100 ppb. The brine leaves Unit 10 as a purified NaCl brine which is passed onto and used in Unit 1.

As shown in FIG. 4, method for ore treatment may be a closed loop process with an outlet for precious metals, and an outlet for metal hydroxide solid waste. Accumulation of sulfates in the system, originating from the oxidation of sulfides in the ore processing, may be handled by treating a portion of the brine stream using methods as known with those familiar with the process.

Chloric Acid Oxidant

Chloric acid ($HClO_3$) is a strong oxidizer with a high chlorine oxidation valence state of +5, and is reduced to a final product which is a chloride ion, Cl—, thus providing a total of 6 electrons in the oxidation reactions. In comparison, $Cl_2$ gas, when it reacts with water, forms HCl and hypochlorous acid (HOCl) as an active chemical species. The chlorine atom in HOCl only has an oxidation valence state of +1, and provides only 2 electrons in the oxidation reactions when it ends up as the chloride ion as the end product. Thus chloric acid may have more electrons to provide for any of the oxidation reactions required in the ore processing.

The concentration of the chloric acid used for the process may range from about 2 wt % to about 45 wt %, and more preferably in the range of about 5 wt % to about 30 wt %. In addition, chloric acid has a unique chemistry in that it can have specific reactions with various chemical species that are typically present in the ore, such as sulfides, where it may produce chlorine dioxide ($ClO_2$) and chlorites (such as $NaClO_2$) as intermediate oxidative chemical species. Utilizing chloric acid instead of a 100% sodium chlorate ($NaClO_3$) solution may reduce the amount of sodium introduced into the ore slurry mixture. In addition, sodium chlorate requires very strong acid conditions to be active, so additional acid may have to be added or produced to get these conditions, thus increasing chemical consumption and ore processing costs. Thus, utilizing high concentration chloric acid solutions with only a smaller proportion of residual sodium chlorate in the mixture provides a readily active and direct oxidant that may be used in the ore processing, not requiring an external addition of acid to the ore slurry. Advantageously, the combination use of chlorine with chloric acid provides a synergistic oxidation system for the precious metal ore processing.

Suitable chloric acid/sodium chlorate mixtures for the process may be generated a using a three-compartment electrochemical cell with a purified sodium chlorate feedstock. The electrochemical process/unit is described in an exemplary fashion in U.S. Pat. Nos. 5,084,148, 5,223,103, 5,242,553, 5,242,554, 5,248,397, 5,258,105, 5,264,089, 5,296,108, 5,348,683, and 5,409,680 which are incorporated by reference in their entirety. The electrochemical cell may produce chloric acid as well as NaOH and hydrogen as co-products, the NaOH being useful in the metal processing and recovery steps as well as for neutralization of the solutions in the process.

Alternatively, suitable chloric acid solutions may be prepared using an alkali metal chlorate, such as sodium chlorate, reacted with an acid, such as sulfuric acid. The solution mixture may then be cooled to precipitate sodium sulfate, which is less soluble, to reduce the amount of sodium in the chloric acid solution product. The sodium sulfate would have to be disposed of as a waste, or preferably, could be regenerated in an electrochemical acidification cell to regenerate the sulfate into sulfuric acid. The chemical preparation of the chloric acid would preferably be done separately from the ore treatment system as another unit operation on the processing site.

The amount of chloric acid added to the ore slurry may range from about 0.01 to 500 lb/ton of dry ore, preferably from about 0.1 to 100 lb/ton dry ore, and most preferably from about 0.2 to about 20 lb/ton dry ore. The operating temperature for the chlorination and chloric acid ore treatment may range from about 5° C. to about 80° C., and most preferably in the range of about 10° C. to about 60° C.

Electrochemical Cell Cathode Reaction Chemistry

The electrochemical reaction at the cathode of electrochemical cell 150 is the reduction of water where hydrogen gas and hydroxide ions may be formed, as shown in equation (1):

$$2H_2O + 2e^- \rightarrow H_2 + 2OH^- \quad (1)$$

Electrochemical Cell Anode Reaction Chemistry

The anolyte loop of electrochemical cell 150 contains an alkali metal brine, such as an NaCl brine. The feedstock brine to the cell anolyte loop may be composed of a single alkali salt, such as NaCl, or may comprise a mixture of alkali metal chlorides, for example KCl and NaCl. The weight ratio of a specific alkali metal chloride, for example KCl, to the preferred alkali metal chloride salt, NaCl, may range from 1:100 to 1:100, and more preferably from 1:20 to 1:20. NaCl is the preferred alkali metal chloride component of the brine since is much less expensive than the other alkali metal chlorides. The reaction at the anode of electrochemical cell 150 is the oxidation of the chloride ion, as shown in equation (2):

$$2NaCl \rightarrow Cl_2 + 2Na^+ + 2e^- \quad (2)$$

Sodium ions (Na+) pass from the anolyte through the cation exchange membrane and combine with the hydroxide ions ($OH^-$) produced at the cathode to produce sodium hydroxide. The hydrogen from the electrochemical is typically safely diluted to a safe non-explosive concentration with excess air using a blower.

Electrochemical cell 150 may be easily operated at a current density range of between about 0.05 to 10 $kA/m^2$, preferably in a range of 0.1 to 5 $kA/m^2$, and more preferably in a range of about 0.2 to 3 $kA/m^2$.

EXPERIMENTAL RESULTS

Below is a summary of results of the oxidation treatment of various ores and ore tailings.

Example 1: Water and Chlorine Gas Treatment Only

A one (1) ton sample of "B" grade concentrates from a gold ore facility was taken and accurately mixed and split into 10 separate reactor charges. The 100 and 300 lb samples were placed into a designed pilot scale mixing apparatus using a closed loop chlorine treatment system. Water was added to each charge, and the ore was contacted with a recirculated chlorine gas stream using a 5 lb/day capacity chlorine electrochemical cell in a closed loop chlorine system operating under a negative pressure for a measured period of time. The chlorine generation from electrochemical cell 150 was controlled using selected pH setpoints for the treated ore slurry and for the electrochemical cell 150 anolyte loop. The ore was contacted or mixed for a total time of 24 hours. The ore leachate solution from the treatment containing the gold was then treated with urea to neutralize the residual chlorine and then processed for gold recovery.

The electrochemical cell used was a two compartment cell using an $IrO_2$ based MMO (mixed metal oxide) anode, a stainless steel cathode, and a Nafion 324 membrane. A saturated brine NaCl solution (300 g/l) was used as the feed solution to the anode compartment, and deionized water was metered into the cathode compartment to control the catholyte NaOH concentration at about 10 wt % as NaOH. The cell had an active membrane area of 121 $in^2$ or 781 $cm^2$. The chlorine cell was operated at an input current of 25 amps, producing about 0.073 lb of chlorine gas per hour. The unit was operated in an on/off control using various pH setpoints of the ore slurry and anolyte loop as described previously. The amount of generated chlorine was determined by the integrated operating time of electrochemical cell 150 during the treatment. The ore leachate solution from the treatment containing the gold was then treated with urea to neutralize residual chlorine and then processed and the gold recovered.

The resulting sample volume of gold bearing solution from the treatment was then analyzed using an ICP-MS (inductively coupled plasma mass spectrometer). Samples of each of the treated or referred to as barren ore, was analyzed for the remaining amount of gold present using an aqua regia acid digestion/extraction and metal analysis by ICP-MS. The chlorine treatment method showed gold recoveries from the ore of better than 99.9%.

The test results are shown in Table 1.

TABLE 1

| Ore Sample Designation | Ore Sample Weight in lbs | Total Solution Volume After Ore Treatment in Liters | Gold recovered as Au/ton Ore | Analysis of Remaining Au in treated barren ore in Au/ton Ore | Gold Recovery Percentage from Ore | Estimated Chlorine Addition in lbs | Chlorine Addition rate per ton ore as lb $Cl_2$/ton dry ore |
|---|---|---|---|---|---|---|---|
| 14001 | 100 | 132.2 | 100.472 | 0.076 | 99.92% | 0.15 | 3.0 |
| 14002 | 100 | 131.6 | 123.704 | 0.076 | 99.94% | 0.25 | 5.0 |
| 14003 | 100 | 130.3 | 127.694 | 0.076 | 99.94% | 0.30 | 6.0 |
| 14004 | 100 | 130.8 | 151.728 | 0.076 | 99.95% | 0.40 | 8.0 |
| 14005 | 100 | 129.9 | 132.498 | 0.076 | 99.94% | 0.44 | 8.8 |

The chlorine only treatment was found to be effective in recovering the gold from ore using a chlorine addition rate as low as about 3.0 lb $Cl_2$/ton of ore for a 99.9% gold recovery in the 100 lb ore sample batches.

Example 2: Water and Chlorine Gas with Added Chloric Acid to Ore

In this set of test runs, an addition of a chloric acid solution was added to the ore slurry solution during the chlorine treatment to determine if the gold removal efficiency could be increased and if the treatment time could be reduced. One (1) liter of 20 wt % chloric acid solution (0.55 lb chloric acid) was slowly metered into the ore slurry once the pH of the slurry reached a pH of about 2.0 during the chlorine treatment. The chloric acid application rate was calculated to be 3.7 lb/ton of dry ore. The chloric acid was prepared from acidifying sodium chlorate with sulfuric acid and precipitating out the sodium sulfate with sub-zero cooling. The ore was mixed and treated with chlorine in the closed loop system for a total time of 12 hours, which was shorter than the treatment time than Example 1, on the assumption that the treatment processing would be shorter because of the added chloric acid. Electrochemical cell 150 was operated in an on/off control using various pH setpoints of the ore slurry and anolyte loop as described previously in Example 1. The ore leachate solution from the treatment containing the gold was then treated with urea to neutralize residual chlorine and then processed for gold recovery.

The results are shown in Table 2.

TABLE 2

| Ore Sample Designation | Ore Sample Weight in lbs | Total Solution Volume After Ore Treatment in Liters | Gold recovered as Au/ton Ore | Analysis of Remaining Au in treated barren ore in Au/ton Ore | Gold Recovery Percentage from Ore | Estimated Chlorine Addition in lbs | Chlorine Addition rate per ton ore as lb $Cl_2$/ton dry ore |
|---|---|---|---|---|---|---|---|
| 14006 | 300 | 380.5 | 98.930 | 0.078 | 99.92% | 0.40 | 2.7 |
| 14007 | 300 | 383.7 | 143.248 | 0.078 | 99.95% | 0.40 | 2.7 |
| 14008 | 300 | 380.5 | 104.003 | 0.078 | 99.93% | 0.35 | 2.3 |
| 14009 | 300 | 381.1 | 121.952 | 0.078 | 99.94% | 0.45 | 3.0 |
| 14010 | 300 | 380.2 | 149.545 | 0.078 | 99.95% | 0.55 | 3.7 |

The chlorine and chloric acid treatment was found to be effective in recovering the gold from ore using a chlorine addition rate as low as about 2.3 lb $Cl_2$/ton of ore for a 99.9% gold recovery from the ore. The advantage of this process is that the use of chloric acid can significantly decrease the oxidation treatment time for the precious metal containing ore and maintain a high 99.9% recovery of the gold from the ore.

ALTERNATIVE EMBODIMENTS

In prior art gold ore processing methods, the processing endpoint was determined on obtaining a pH, oxidation-reduction potential (ORP), or a timed process endpoint depending on the process selected and the type of ore processed. A more definitive endpoint processing method may be able to determine the processing endpoint using an alternative device or instrument, such as XRF (x-ray fluorescence), which can quickly and easily be used to analyze and monitor the progress of the ore leaching. XRF may be used to analyze and estimate the ore composition for gold and the other precious and rare earth metals, and may be used to calculate their expected concentration in a known volume of leachate solution during processing. XRF may also be used to determine that the maximum ore leaching has taken place by monitoring the metal concentrations and determining if their concentrations have reached a maximum. In addition, XRF may be used to provide the concentrations of chloride and other anions in the ore, process solutions, and in the metal recovery steps. XRF sensors may also be employed for on-line and in-line monitoring and analysis of the ore processing flow steams.

In another embodiment, the use of an optical type chlorine gas analyzer, such as a spectrophotometer type unit, for monitoring the amount of chlorine gas in the chlorination loop may be employed so that it may control electrochemical cell 150 and the chorine generation rate may be reduced or stopped when the ore may not consume any additional chlorine. Chlorine gas has a UV/Vis absorption maxima at about 330-340 nm.

In an alternative embodiment, the novel use of chloric acid or chloric acid/sodium chlorate solution mixtures may alone be used as the oxidant in the treatment of the precious metal and rare earth metals, without the need for any external acid addition or co-addition of chlorine. In this embodiment, the chloric acid solution alone would be mixed into the ore slurry during treatment. The $HClO_3$/$NaClO_3$ mixtures are preferably produced electrochemically from sodium chlorate, but can also be produced chemically by reacting a mixture of sodium chlorate with concentrated sulfuric acid and precipitating most of the sodium sulfate from the mixture by cooling. The chloric acid solution concentration for the process may range from about 2 wt % to about 40 wt %, more preferably from about 5 wt % to about 30 wt %, and most preferably from about 10 wt % to about 25 wt % as chloric acid. The balance of the chlorate ion ($ClO_3^-$) content in the chloric acid solutions may further consist as sodium chlorate up to the total solubility of chlorate ion in the solution.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for chemically extracting metals from ore and ore tailings, comprising:
    generating chlorine gas from an electrochemical cell using an alkali metal chloride feedstock that is co-producing an alkali metal hydroxide co-product;
    transferring the chlorine gas under negative atmospheric pressure into a rotating ore mixing apparatus which includes an aqueous slurry of ore;
    treating the aqueous slurry of ore with the chlorine gas for a sufficient time period or to a pH level in the ore slurry to allow for dissolution of metals from the ore;
    recycling unreacted chlorine gas to the electrochemical cell;
    separating the ore from the aqueous ore slurry;
    rinsing the ore with water to remove and recover metal containing solution;
    neutralizing the ore with a dilute alkali metal hydroxide solution, after the ore has been rinsed, for ore disposal;
    treating the metal containing solution with an amount of reducing agent;
    separating and recovering at least one metal from the metal containing solution via ion exchange and chemical separation; and
    recycling the metal containing solution, after the at least one metal has been separated, to the electrochemical cell after neutralization with an alkali metal hydroxide solution.

2. The method of claim 1, wherein the electrochemical cell includes a perfluorinated sulfonic acid type cation exchange membrane with separate anode and cathode compartments.

3. The method of claim 1, wherein the at least one metal separated and recovered from the metal containing solution includes one or more of gold, silver, platinum, palladium, ruthenium, rhodium, rhenium, iridium, or osmium.

4. The method of claim 1, wherein the at least one metal separated and recovered from the metal containing solution includes one or more of tellurium, neodymium, europium, gadolinium, dysprosium, erbium, cerium, yttrium, lanthanum, or samarium.

5. The method of claim 1, wherein the reducing agent includes one or more of hydrogen peroxide, alkali metal peroxide, urea, formic acid, citric acid, ascorbic acid, or alcohol.

6. The method of claim 1 wherein the reducing agent includes one or more of $SO_2$, alkali metal sulfite, alkali metal metabisulfite, or alkali metal sulfide.

7. The method of claim 1, wherein treating the aqueous slurry of ore with the chlorine gas for to a pH level between 0.1 to about 4.0.

8. The method of claim 1, wherein treating the aqueous slurry of ore with the chlorine gas for a sufficient time period or to a pH level in the ore slurry to allow for dissolution of metals from the ore is conducted in a temperature range of between 5° C. to 80° C.

9. The method of claim 1, wherein treating the aqueous slurry of ore with the chlorine gas for a sufficient time period or to a pH level in the ore slurry to allow for dissolution of metals from the ore is through a closed loop system with chlorine gas generation and addition controlled by monitoring the pH value of the aqueous ore slurry.

10. A method for chemically extracting metals from ore and ore tailings, comprising:

generating chlorine gas from an electrochemical cell using an alkali metal chloride feedstock that is co-producing an alkali metal hydroxide co-product;

transferring the chlorine gas under negative pressure into a rotating ore mixing apparatus including an aqueous slurry of ore;

adding an amount of chloric acid or a mixture of chloric acid and sodium chlorate to the aqueous slurry of ore;

treating the aqueous slurry of ore with the chlorine gas and at least one of chloric acid or a mixture of chloric acid and sodium chlorate for a sufficient time period or to a pH level in the aqueous slurry of ore to allow for dissolution of metals from the ore;

recycling unreacted chlorine gas to the electrochemical cell;

separating the ore from the aqueous ore slurry;

rinsing the ore with water to remove and recover metal containing solution;

neutralizing the ore with a dilute alkali metal hydroxide solution, after the ore has been rinsed, for ore disposal;

treating the metal containing solution with an amount of reducing agent;

separating and recovering at least one metal from the metal containing solution via ion exchange and chemical separation; and recycling the metal containing solution, after the at least one metal has been separated, to the electrochemical cell after neutralization with an alkali metal hydroxide solution.

11. The method of claim 10, wherein the electrochemical cell includes a perfluorinated sulfonic acid type cation exchange membrane with separate anode and cathode compartments.

12. The method of claim 10, wherein the at least one metal separated and recovered from the metal containing solution is one or more of gold, silver, platinum, palladium, ruthenium, rhodium, rhenium, iridium, or osmium.

13. The method of claim 10, wherein the at least one metal separated and recovered from the metal containing solution includes one or more of tellurium, neodymium, europium, gadolinium, dysprosium, erbium, cerium, yttrium, lanthanum, or samarium.

14. The method of claim 10, wherein the reducing agent includes one or more of hydrogen peroxide, alkali metal peroxide, urea, formic acid, citric acid, ascorbic acid, or alcohol.

15. The method of claim 10, wherein the reducing agent includes one or more of $SO_2$, alkali metal sulfite, alkali metal metabisulfite, or alkali metal sulfide.

16. The method of claim 10, wherein treating the aqueous slurry of ore with the chlorine gas for to a pH level between 0.1 to about 4.0.

17. The method of claim 10, wherein treating the aqueous slurry of ore with the chlorine gas for a sufficient time period or to a pH level in the ore slurry to allow for dissolution of metals from the ore is conducted in a temperature range of between 5° C. to 80° C.

18. The method of claim 10, wherein treating the aqueous slurry of ore with the chlorine gas for a sufficient time period or to a pH level in the ore slurry to allow for dissolution of metals from the ore is through a closed loop system with chlorine gas generation and addition controlled by monitoring the pH value of the aqueous ore slurry.

* * * * *